May 29, 1956 W. W. WARNER 2,748,332
REVERSING MOTOR CIRCUIT
Filed Jan. 4, 1954
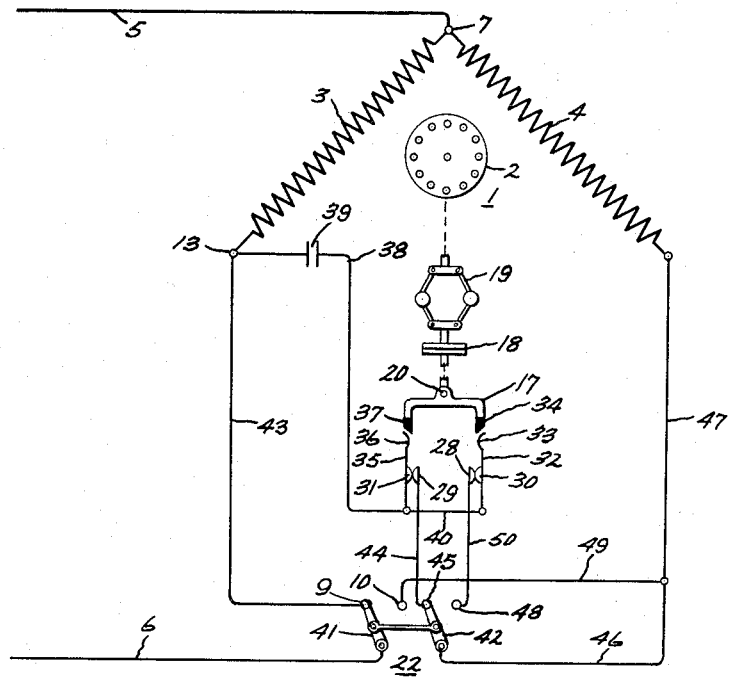
Inventor:
Wilbur W. Warner,
by *Robert G. Saul*
His Attorney.

United States Patent Office 2,748,332
Patented May 29, 1956

2,748,332

REVERSING MOTOR CIRCUIT

Wilbur W. Warner, Fort Wayne, Ind., assignor to General Electric Company, a corporation of New York Application January 4, 1954, Serial No. 402,030

1 Claim. (Cl. 318—207)

This invention relates to electric motors and more particularly to improved reversing circuits for single phase alternating current motors.

It is frequently desirable that the reversal of the direction of rotation of a single phase alternating current motor be as close to instantaneous as possible and that it be possible to throw the reversing switch instantly without fear that the motor will not reverse. Various schemes have been devised to effect this with a reasonable amount of success. However, the number of elements necessary for such a circuit to perform properly has remained rather high. It is, therefore, highly desirable to achieve a successful reversing circuit with a minimum of outside leads, as simple a switch as possible, and a minimum of internal structure.

It is, therefore, an object of this invention to provide an instantaneously acting reversing circuit for a single phase alternating current electric motor including the above mentioned desirable features.

Further objects and advantages of this invention will become apparent and the invention will be better understood by reference to the following description and the accompanying drawing; and the features of novelty which characterize this invention will be pointed out with particularity in the claim annexed to and forming a part of this specification.

This invention, in its broadest aspect, provides a reversing circuit for a single phase alternating current motor which will bring about practically instantaneous reversal and which will permit instant switching. A direction and speed sensitive mechanism is used, in connection with a pair of like motor windings, to readjust the circuit upon reversal so that each winding acts as a main winding in one direction of rotation. The speed and direction sensitive mechanism also provides for disconnecting the starting winding at the desired predetermined speed and for establishing in advance a starting winding circuit which will become operative upon reversal of the motor.

In the drawings, the single figure is a schematic diagram of the improved circuit of this invention.

Referring now to the figure, there is shown a single phase alternating current motor 1, for example an induction motor having a squirrel cage rotor 2 with a pair of field windings 3 and 4, each of these windings being adapted to act either as a starting winding or a running winding. Energization for the motor is provided by an external source of alternating current (not shown) through lines 5 and 6. Windings 3 and 4 are connected to line 5 and to each other at point 7. A two pole double throw switch 22 having a pair of mechanically interlocked contact arms 41 and 42 is arranged so that arm 41 will connect one of two terminals 9 and 10 to line 6 and arm 42 will connect one of two terminals 45 and 48 to a line 46 which is joined to winding 4 through a line 47. When contact arm 41 is in engagement with terminal 9, contact arm 42 engages terminal 45, and for the other position of the switch the arms 41 and 42 engage respectively the terminals 10 and 48. Terminal 9 is connected through a line 43 to point 13 and winding 3, and terminal 10 is connected to a line 49 which joins the junction point of lines 46 and 47.

A speed and direction responsive member 17 is connected through friction device 18 and a centrifugal member 19 to rotor 2 of motor 1. Member 17, as shown in the schematic diagram, is pivoted at point 20 so that depending upon the direction of rotation of rotor 2 it may pivot either clockwise or counterclockwise.

Terminal 45 is connected through a line 44 to a contact 29, and terminal 48 is similarly connected through a line 50 to a contact 28. Contact 28 is normally biased into engagement with contact 30 and contact 29 has a like relationship with contact 31. Contact 30 is carried on an arm 32 having an end portion 33 adapted to be engaged by insulated end 34 of member 17 when member 17 pivots clockwise. Contact 31 is carried on an arm 35 having an end portion 36 adapted to be moved by insulated portion 37 of arm 17 when the member is moved counterclockwise. Thus, upon clockwise motion of member 17 contact 30 will be forced away from contact 28, and upon counterclockwise motion of member 17 contact 31 will be forced away from contact 29. A line 38 containing a serially connected phase displacing device, such as a capacitor 39, extends between point 13 and arm 35. Line 40 forms a continuation of line 38 past arm 35 to arm 32.

In operation, in the position shown, blade 41 is adapted to connect line 6 to terminal 9, whence the circuit goes through line 43, winding 3, and line 5. A second circuit is established starting from point 13 through condenser 39, line 38, contacts 31 and 29, line 44, contact 45, switch arm 42, lines 46 and 47, through winding 4 to line 5. As the motor speeds up member 17 will pivot counterclockwise opening contacts 31 and 29 without interfering with contacts 28 and 30. Winding 4 is thus disconnected and the motor will run on winding 3 alone. When switch 41 is thrown so that arm 41 connects line 6 to terminal 10 and arm 42 contacts terminal 48, the main winding circuit will then be from terminal 10 through line 49, line 47, winding 4, and line 5. The starting winding circuit will extend from terminal 10 through line 49, line 46, arm 42, terminal 48, line 50, contacts 28 and 30, line 40, line 38, condenser 39, and winding 3 to line 5. At the predetermined speed member 17 will pivot clockwise to open contacts 28 and 30 and thus disconnect starting winding 3. This pivoting of member 17 also permits contacts 31 and 29 to close in readiness for the next reversal of motor 1.

It will be seen that upon reversal of the motor in either direction by throwing switch 22, both the main winding circuit and the starting winding circuit will be completed and that therefore a plugging action will occur until the motor has stopped its rotation in the one direction and has started its rotation in the opposite direction. This result is achieved using only five external leads and a double pole double throw switch.

While this invention has been explained by describing a particular embodiment thereof it will be apparent that improvements and modifications may be made without departing from the scope of the invention as defined in the appended claim.

What I claim as new and desire to secure by Letters Patent of the United States is:

A reversible self starting single phase alternating current motor comprising a pair of windings, a pair of running circuits and a pair of starting circuits respectively including said windings for selectively energizing said windings, a condenser common to said starting circuits, two pairs of contacts associated respectively with said starting circuits and serially connected with said condenser, a two-pole double throw switch for selecting one of said running circuits and one of said starting circuits whereby one of said windings is directly energized through the selected running circuit associated therewith and the other of said windings is simultaneously energized through the selected starting circuit, said switch including one contact arm arranged to be selectively connected to one of said running circuits, and including a second contact arm mechanically secured to said first contact arm so as to be movable therewith and arranged to be selectively serially connected to one of said pairs of contacts thereby to complete one of said starting circuits, and means responsive to the direction of rotation of said motor, said responsive means being cooperable with said pairs of contacts and adapted to selectively open one of said pairs of contacts at a predetermined speed thereby to open the selected starting circuit so as to disconnect that one of said windings which is being energized through said condenser, the other of said pairs of contacts remaining closed whereby upon actuation of said switch the other of said circuits will be energized and a circuit will immediately be completed rapidly to reverse the direction of rotation of said motor.

References Cited in the file of this patent
UNITED STATES PATENTS

| | | |
|---|---|---|
| 2,195,287 | Schaefer | Mar. 26, 1940 |
| 2,205,787 | Brongersma | June 25, 1940 |
| 2,330,648 | Warner | Sept. 28, 1943 |
| 2,382,827 | Sprague et al. | Sept. 28, 1945 |
| 2,406,430 | Mason | Aug. 27, 1946 |
| 2,528,845 | Sprague | Nov. 7, 1950 |
| 2,580,242 | Reek | Dec. 25, 1951 |
| 2,586,734 | Sprague et al. | Feb. 19, 1951 |
| 2,592,492 | Trant | Apr. 8, 1952 |
| 2,598,440 | Reek | May 27, 1952 |
| 2,673,319 | Frey | Mar. 23, 1954 |
| 2,683,844 | Shaefer | July 13, 1954 |